G. C. COWLES.

Assignor of one-half to E. GERMAIN.

DRIVE PULLEY.

No. 11,020. Reissued Aug. 6, 1889.

WITNESSES
C. J. Shipley
L. A. Duelty

INVENTOR
George C. Cowles
By Wells W. Leggett & Co.
Attorneys.

N. PETERS, Photo-Lithographer, Washington, D. C.

Figure 5:
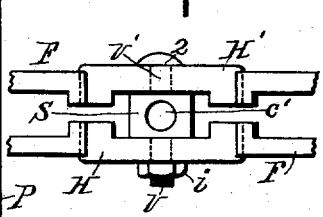

G. C. COWLES.
Assignor of one-half to E. GERMAIN.
DRIVE PULLEY.
No. 11,020. Reissued Aug. 6, 1889.
Fig. 5.
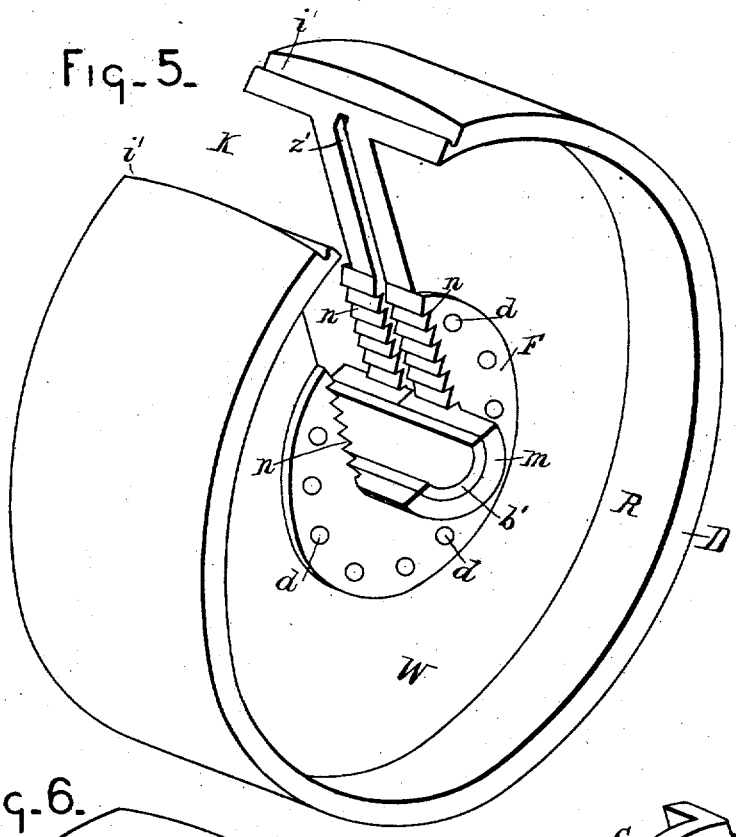
Fig. 6.
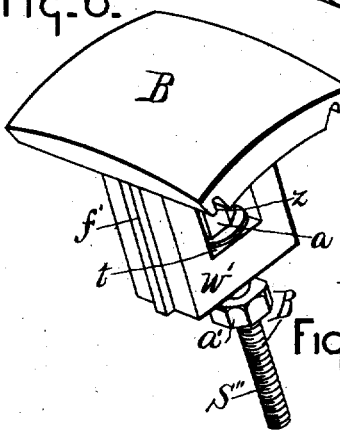
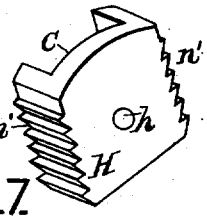
Fig. 7.
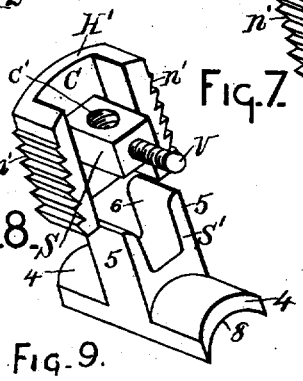
Fig. 8.
Fig. 9.
WITNESSES
C. J. Shipley
L. A. Duelty
INVENTOR
George C. Cowles.
By Mills N. Leggett & Co.
Attorneys.
N. PETERS, Photo-Lithographer, Washington, D. C.

UNITED STATES PATENT OFFICE.

GEORGE C. COWLES, OF EAST SAGINAW, MICHIGAN, ASSIGNOR OF ONE-HALF TO EDWARD GERMAIN, OF SAME PLACE.

DRIVE-PULLEY.

SPECIFICATION forming part of Reissued Letters Patent No. 11,020, dated August 6, 1889.

Original No. 403,460, dated May 14, 1889. Application for reissue filed June 8, 1889. Serial No. 313,629.

*To all whom it may concern:*

Be it known that I, GEORGE C. COWLES, a citizen of the United States, residing at East Saginaw, in the county of Saginaw and State of Michigan, have invented certain new and useful Improvements in Drive-Pulleys; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to "drive-pulleys," and particularly to the construction of parts whereby the pulley is made self-gripping to the shaft, and also in the construction of the parts whereby a section of the pulley may be readily removed, so as to enable removing the pulley from the shaft without disturbing the shaft in its bearings or any other pulley that may be upon the same shaft.

The features of this invention are illustrated in the drawings as applied to what is known as a "wood pulley." The rim and web are made up of layers of thin wood glued together, so as to cross the grain of each layer, thus forming a light and strong pulley.

The essential features of this invention will be pointed out particularly in the claims.

Figure 1:
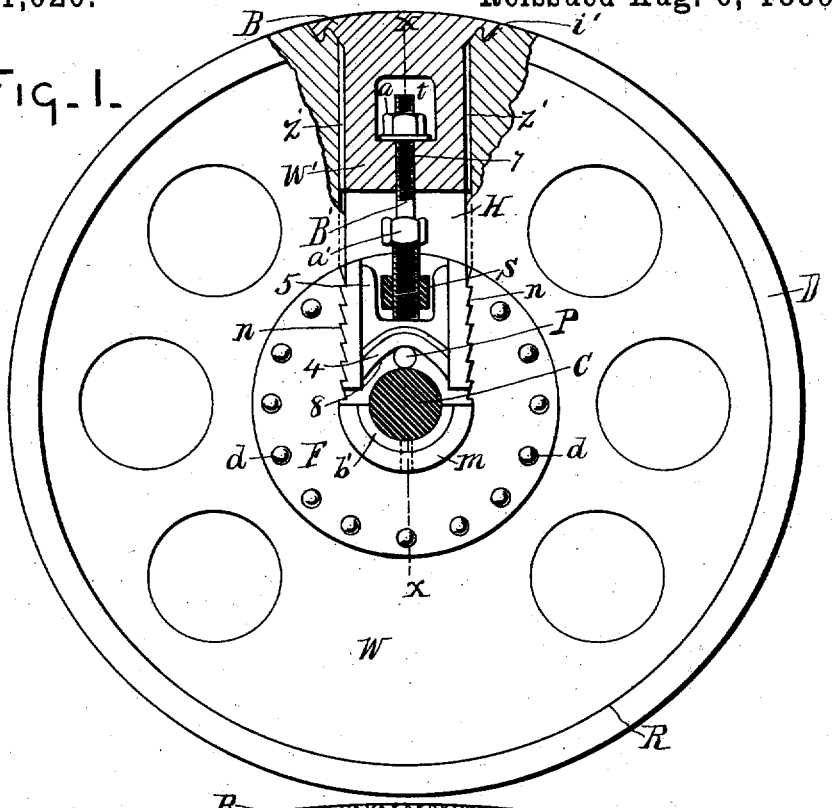
Figure 2:
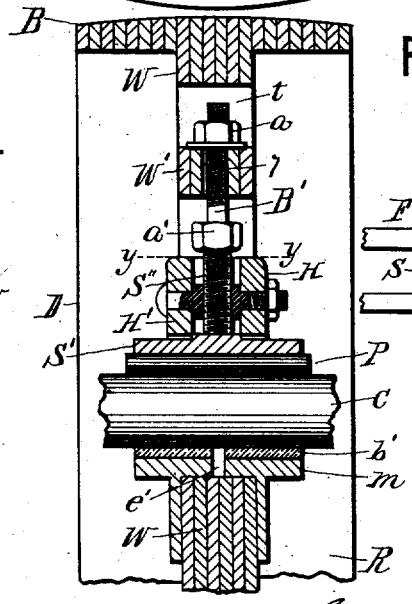
Figure 4:
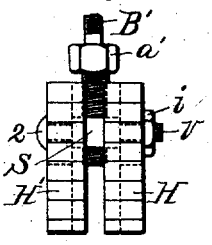

In the accompanying drawings, forming a part of this specification, Figure 1 is a side plan of the pulley mounted on a shaft, some parts being in section. Fig. 2 is an enlarged central section of Fig. 1, taken on the dotted line *x x*. Figs. 3 and 4 are detail plans of the locking-heads. Fig. 5 is a perspective of the pulley having the detachable part removed. Figs. 6, 7, 8, and 9 are perspective views of the locking and detachable parts of the pulley, all of which will be fully hereinafter set forth.

As indicated in the drawings, D represents the pulley; R, the flange; W, the central supporting-web. To said web and at the center of the wheel is secured on each side of the web a C-shaped metal flange or plate F, as shown in Fig. 5, in which *d* represents the rivets. The flange-plates F are provided with the toothed or notched surfaces *n*, and said plates have integral therewith the journal-box *m*, in which latter is placed the wood bushing *b'*.

In Fig. 5 K represents the opening formed in the pulley by the removal of the part B of Fig. 6. The web W is provided at the opening K with the channels or grooves *z'*, and the main rim R of the pulley is provided with the transverse grooves *i'*, which, when the parts are coupled, as shown in Fig. 1, receive the transverse lips *z* on the detachable portion of the pulley. This detachable section B is provided with a webbed portion W' to register with the web W of the main portion of the pulley when the parts are coupled, as shown in Figs. 1 and 2. The web W' is provided on its edges with the tongues *f'*, which fill the grooves *z'* when the pulley is in its completed condition.

In Fig. 8 H' represents a locking plate or head having on its opposite faces the notched or toothed surfaces *n'*, which register and engage with the teeth of the flange-plates F, as shown in Fig. 1. S is a coupling-head having the central screw-threaded hole *c'*. This coupling-head has a stem V', which passes through the locking-head H', and is riveted or upset at 2. (See Fig 3.) Projecting from the opposite face of the coupling-head is a screw-threaded stem V.

In Fig. 7 is shown a second locking-head H, which is constructed the same as the head H', having the chamber *c*. These locking-heads are secured together by passing the stem V of the head S through the hole *h* of the locking-head H and applying the nut *i*, as shown in Figs. 3 and 4.

Fitting into the chamber *c*, formed within the joined locking heads or plates, are the upwardly-extending wings 5 of the metal saddle or yoke S'. The horizontally-projecting ends 4 of the yoke are concavo-convex. The curvature or concave at 8 is of less diameter on a horizontal than a vertical line. (See Fig. 1.) The object will be hereinafter set forth.

In Figs. 1, 2, and 6 it will be observed that the web W' is provided with an opening *t*, leading horizontally through the web. Passing vertically through the web and at right angles to the opening is the hole 7. This hole receives the upper end of the bolt B′, having the nut *a*. At or near the center of bolt B′ and made fast thereto is the collar or nut *a*′. The lower screw-threaded end S″ of this bolt enters the hole *c*′ of the coupling-head S, as shown in Figs. 1, 2, and 4, whereby all parts are locked together, as shown in Figs. 1 and 2.

In Figs. 1 and 2 C represents the main or drive shaft, to which the pulley is made fast by placing under the yokes S′ and on the shaft C the metal corrugated or friction roller P. The detachable parts being removed from the wheel, as shown in Fig. 5, the wheel is applied to the shaft C by passing it so as to allow the shaft to pass through the opening K and meet the journal-box, as shown in Figs. 1 and 2. The saddle S′ is then placed over the shaft, with the corrugated roller P centrally under it, as shown in Fig. 1. The locking-heads H H′ are then engaged with the teeth of the flanges F, the bolt B′ being screwed into the coupling-head S, as shown in Fig. 2. The detachable section B is then dropped into place, closing the gap. The nut *a* being applied to the upper end of the bolt B′, the locking-heads and section are firmly and rapidly secured together, thereby completing the pulley and the attaching of it to the shaft.

It will be observed on looking at Fig. 1 that greater space between the saddle and the shaft for the roller P to lie in is directly at the center over the shaft, and that the curvature of the saddle at 8 is shorter or less than at the shaft C. By this arrangement a partial rotation of the pulley on the shaft causes the roller P to travel in the narrow space, whereby the pulley becomes firmly attached to the shaft, and may be released by a partial rotation, so as to bring the roller P back to the position shown in Fig. 1. In this position the pulley may be moved along on the shaft to change its location horizontally on the shaft.

To remove the pulley from the shaft, it is first rotated, so as to loosen the roller P. Then the nut *a* is removed from the bolt B′. The part B is then drawn out of the pulley, as shown in Figs. 5 and 6. The locking-heads and the saddle are then removed, when the pulley may be removed from the shaft and without disturbing any of its bearings or supports.

It will be observed that the removable section is thus composed of two parts—the removable rim and the removable hub—and these parts are so connected together that they have a relative adjustment with respect to each other. By this means the hub-section can be first placed in position and the saddle adjusted inward firmly on the shaft, and then the rim-section inserted and drawn firmly into position by the adjustable connection with the hub-section. Thus the pulley can not only be applied and adjusted to a shaft, but any wear on the parts can be easily taken up without deranging the rim and the removable section be always kept snugly in place.

What I claim is—

1. In a pulley having an opening from the center out through the periphery, the combination, with a removable hub-section adapted to be placed in the opening in the web and means for engaging it in place, of a removable rim-section adapted to fill the opening in the rim, and intermediate adjusting mechanism, whereby the parts have a relative adjustment toward or from each other, substantially as described.

2. In a pulley having a portion of the hub and rim made removable, the combination, with the main body of the wheel, of a head within said opening engaged with said main body by a notched or ratchet engagement, and in connection therewith separate rim and hub sections with adjusting mechanism, whereby said sections may be adjusted toward or from each other, substantially as described.

3. In a pulley having an opening from the center out through the periphery, the combination, with a removable hub-section and means for securing it in the opening in the web, a removable rim-section adapted to fill the opening in the rim, and intermediate adjusting mechanism whereby the parts have a relative adjustment toward or from each other, of flanges secured to each side of the web adjacent to the center, said flanges carrying the journal-bearing, substantially as described.

4. In a drive-pulley having an opening from its center to its periphery, the combination, with flanges secured to the web and carrying the journal-bearing, of a saddle, with means for securing it in said opening, said saddle being of greater concavity than the convexity of the shaft, and a roller between the shaft and saddle adapted to lock the pulley firmly to the shaft when the former is partially revolved, substantially as described.

GEORGE C. COWLES.

Witnesses:
W. H. CHAMBERLIN,
L. A. DOELTY.